(12) United States Patent
Mouri et al.

(10) Patent No.: US 7,401,468 B2
(45) Date of Patent: Jul. 22, 2008

(54) MASTER CYLINDER

(75) Inventors: Tomonori Mouri, Kai (JP); Daigoro Kamase, Fukuoka (JP); Yasuhiko Amari, Kofu (JP); Naganori Koshimizu, Kai (JP)

(73) Assignee: Hitachi, Ltd., Tokyo (JP)

( * ) Notice: Subject to any disclaimer, the term of this patent is extended or adjusted under 35 U.S.C. 154(b) by 318 days.

(21) Appl. No.: 11/235,181

(22) Filed: Sep. 27, 2005

(65) Prior Publication Data

US 2006/0064978 A1 Mar. 30, 2006

(30) Foreign Application Priority Data

Sep. 30, 2004 (JP) ............................. 2004-289275
Nov. 30, 2004 (JP) ............................. 2004-347341

(51) Int. Cl.
*B60T 11/236* (2006.01)
(52) U.S. Cl. ........................... 60/588; 277/441
(58) Field of Classification Search .................. 60/588; 277/436, 441
See application file for complete search history.

(56) References Cited

U.S. PATENT DOCUMENTS 4,524,585 A 6/1985 Coll et al.
6,581,380 B2 * 6/2003 Dangel et al. ................. 60/588
2006/0091613 A1 * 5/2006 Drott et al. .................. 277/436

FOREIGN PATENT DOCUMENTS

JP 2004-231093 8/2004

* cited by examiner

*Primary Examiner*—F. Daniel Lopez
(74) *Attorney, Agent, or Firm*—Wenderoth, Lind & Ponack, L.L.P.

(57) ABSTRACT

A piston seal is provided in a circumferential groove formed in a cylinder body. The piston seal is capable of sealing a pressure chamber, which supplies fluid pressure to a discharge passage, from a supply passage, which communicates with a reservoir. The piston seal comprises: an annular base portion; an inner circumferential lip portion projecting from an inner circumferential side of the base portion and being in slidable contact with an outer circumferential surface of a piston; an outer circumferential lip portion projecting from an outer circumferential side of the base portion and being in abutment with the circumferential groove of the cylinder body; and an intermediate projecting portion which is formed between the inner circumferential lip portion and the outer circumferential lip portion of the base portion and which is projected beyond the outer circumferential lip portion. Cutout grooves are formed on a tip side of the intermediate projecting portion. Therefore, when releasing air, a sufficient amount of brake fluid can be supplied through a gap between the piston seal and a bottom surface of the circumferential groove, and the cutout groove. As a result, the number of repetitions of an air releasing operation can be minimized.

17 Claims, 6 Drawing Sheets

MASTER CYLINDER

BACKGROUND OF THE INVENTION

The present invention relates to a master cylinder for supplying brake fluid to a brake apparatus of a vehicle.

Generally, a master cylinder of this type comprises: a cylinder that has a sleeve incorporated into a cylinder body and that is also provided with a discharge passage for and a supply passage for brake fluid; a cup-shaped piston (a plunger) which is slidably disposed in the cylinder to thereby form a pressure chamber between the piston and the cylinder, the pressure chamber supplying a fluid pressure to the discharge passage; and a piston seal which is provided between the cylinder and the piston and is capable of sealing a space between the supply passage and the pressure chamber. However, a cylinder formed by combining a cylinder body and a sleeve, such as the one described above, obviously requires more parts. Further, the radial size of the cylinder becomes larger, resulting in a larger overall size of the master cylinder. Therefore, it has been proposed to use a master cylinder in which a piston is directly inserted into a cylinder body without use of a cylinder sleeve (see, for example, U.S. Pat. No. 4,524,585).

In this master cylinder, a cylinder body includes a communication groove which opens into a circumferential groove and extends from the circumferential groove toward a closed end of the cylinder body, to thereby allow communication between a discharge passage and the circumferential groove. When brake fluid is filled into the cylinder body, a piston seal is opened due to a pressure difference, and the brake fluid is flowed into the discharge passage through a gap between the piston seal and a bottom surface of the circumferential groove, and the communication groove. However, in this master cylinder, the communication groove is located inward of the bottom surface of the circumferential groove, relative to a radial direction of the cylinder. Therefore, when brake fluid is filled, a negative pressure in the cylinder body acts on the piston seal. This causes an end portion of an outer circumferential surface of the piston seal to rise from the bottom surface of the circumferential groove and to adhere to a side surface. Under these circumstances, a flow of brake fluid into the communication groove through the gap between the outer circumferential surface of the piston seal and the bottom surface of the circumferential groove is obstructed by the piston seal adhering to the side surface. As a result, the supply of the brake fluid is restricted and a brake-fluid filling operation sometimes has to be repeated several times.

SUMMARY OF THE INVENTION

Therefore, it is an object of the present invention to provide a master cylinder in which, when releasing air, a sufficient amount of brake fluid can be supplied through a gap between an outer circumferential surface of a piston seal and a bottom surface of a circumferential groove, and a communication groove, so that the number of repetitions of a brake-fluid filling operation can be minimized.

The present invention provides a master cylinder which comprises: a cylinder body in a cylindrical form having one end closed and including a discharge passage and a supply passage for a brake fluid, the supply passage being communicated with a reservoir; a piston slidably disposed in the cylinder body, the piston and the cylinder body defining a pressure chamber therebetween for supplying a fluid pressure to the discharge passage; and a piston seal provided in a circumferential groove formed in the cylinder body, the piston seal having an inner circumferential surface thereof in slidable contact with the piston and being capable of sealing the pressure chamber from the supply passage. The piston seal comprising: an annular base portion; an inner circumferential lip portion projecting from an inner circumferential side of the base portion and being in slidable contact with an outer circumferential surface of the piston; an outer circumferential lip portion projecting from an outer circumferential side of the base portion and being in abutment with the circumferential groove of the cylinder body; and an intermediate projecting portion that is formed between the inner circumferential lip portion and the outer circumferential lip portion of the base portion and that is projected beyond the outer circumferential lip portion. Further, cutout grooves are formed on a tip side of the intermediate projecting portion. Therefore, when the piston moves back, brake fluid in the supply passage is supplied to the pressure chamber through a gap between the outer circumferential lip portion of the piston seal and the bottom surface of the circumferential groove, and the cutout groove of the intermediate projecting portion.

In the present invention, cutout grooves may be formed on a tip side of the outer circumferential lip portion. Further, the intermediate projecting portion is preferably projected beyond the inner circumferential lip portion.

Preferably, a plurality of the cutout grooves are formed in the intermediate projecting portion, have the same width, and are equally spaced in a circumferential direction, a circumferential width of each of the cutout grooves of the intermediate projecting portion being smaller than a circumferential width of each of projecting portions that are alternately disposed with the cutout grooves.

Similarly, it is preferable that a plurality of cutout grooves are formed in the outer circumferential lip portion, have the same width, and are equally spaced in a circumferential direction, a circumferential width of each of the cutout grooves of the outer circumferential lip portion being smaller than a circumferential width of each of projecting portions that are alternately disposed with the cutout grooves. A cutout portion may be formed, over the entire circumferential length of each of the projecting portions, on a radially outer side of a tip of the projecting portion of the outer circumferential lip portion.

The number of the cutout grooves of the intermediate projecting portion is preferably equal to the number of the cutout grooves of the outer circumferential lip portion. Circumferential positions of the cutout grooves of the intermediate projecting portion are preferably adjusted to circumferential positions of the projecting portions that are alternately disposed with cutout grooves in the outer circumferential lip portion. A central angle of each of the cutout grooves of the intermediate projecting portion is preferably smaller than a central angle of each of the projecting portions that are alternately disposed with cutout grooves in the outer circumferential lip portion.

Similarly, circumferential positions of the cutout grooves of the outer circumferential lip portion are preferably adjusted to circumferential positions of the projecting portions that are alternately disposed with the cutout grooves in the intermediate projecting portion. A central angle of each of the cutout grooves of the outer circumferential lip portion is preferably smaller than a central angle of each of the projecting portions that are alternately disposed with cutout grooves in the intermediate projecting portion.

Under a condition in which no external restriction is imposed on the piston seal, a tip portion of the inner circumferential lip portion is preferably tapered so that a radial width of the tip portion decreases toward a side opposite to the base portion. It is also preferable that a radial width of the outer circumferential lip portion gradually increases toward a side opposite to the base portion. The intermediate projecting portion preferably extends straight from the base portion in the axial direction of the base portion.

Positions of the cutout grooves of the intermediate projecting portion and positions of the cutout grooves of the outer circumferential lip portion may correspond at least in part with each other in a circumferential direction of the piston seal.

DETAILED DESCRIPTION OF THE INVENTION

Hereinbelow, referring to the accompanying drawings, description is made in detail with regard to a master cylinder according to an embodiment of the present invention.

Figure 1:
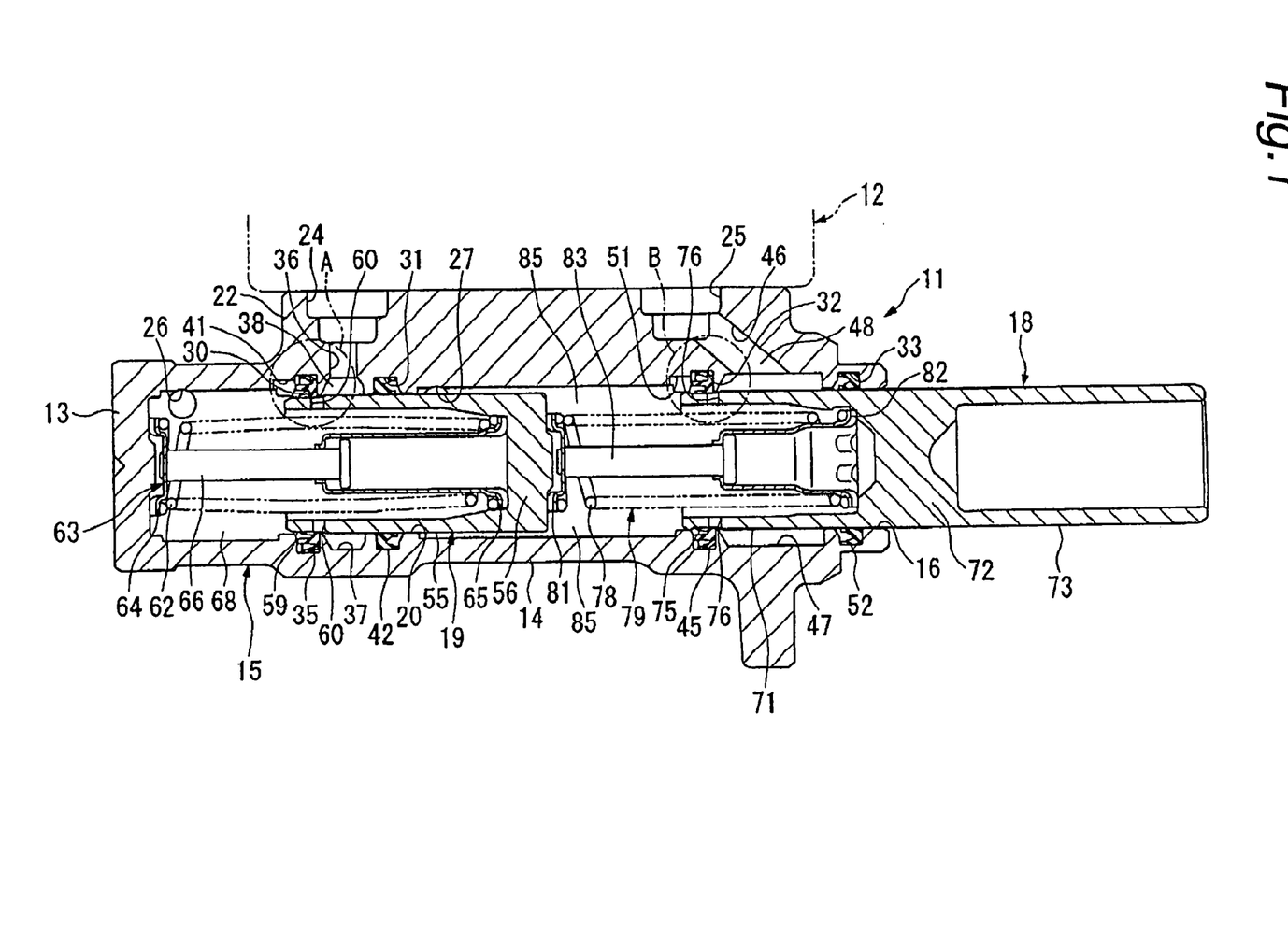
FIG. 1 is a cross-sectional view of a master cylinder according to an embodiment of the present invention.

In FIG. 1, reference numeral 11 denotes a master cylinder according to an embodiment of the present invention. The master cylinder 11 is adapted to generate a brake fluid pressure corresponding to an input from a brake pedal, which is introduced through a brake booster (not shown) into the master cylinder 11. A reservoir 12 is connected to an upper side of the master cylinder 11 so as to allow a flow of brake fluid between the reservoir 12 and the master cylinder 11.

The master cylinder 11 is of a tandem type and comprises a cylinder body 15, a primary piston (a piston) 18, and a secondary piston 19.

The cylinder body 15 is formed from a single workpiece into a cylinder having one end closed and comprises a bottom portion 13 and a cylindrical portion 14. Further, the cylinder body 15 is horizontally mounted in a vehicle. The primary piston 18 is slidably disposed in the cylinder body 15 on a side of an open portion 16 thereof. The secondary piston 19 is slidably disposed in the cylinder body 15 on a side of the bottom portion 13 thereof relative to the primary piston 18.

The primary piston 18 and the secondary piston 19 are slidably guided on a slidable inner-diameter portion 20 having a circular cross-section perpendicular to the axis of the cylindrical portion 14 of the cylinder body 15 (hereinafter referred to as "the axis").

The cylinder body 15 is integrally formed with a mount portion 22 which is projected outward of the cylindrical portion 14 relative to a radial direction of the cylindrical portion 14 (hereinafter referred to as "the radial direction of the cylinder"). The mount portion 22 is located in a predetermined position in a circumferential direction of the cylindrical portion 14 (hereinafter referred to as "the circumferential direction of the cylinder"). Mount openings 24 and 25 for mounting the reservoir 12 are formed in the mount portion 22. The mount openings 24 and 25 are located at the same position relative to the circumferential direction of the cylinder, and spaced apart from each other in a direction of the cylinder axis.

A secondary discharge passage (a discharge passage) 26 and a primary discharge passage (a discharge passage) 27, which are formed in the cylindrical portion 14 of the cylinder body 15 on a side of the mount portion 22.

A brake pipe (not shown) for supplying brake fluid to a brake apparatus (not shown) is connected to the secondary discharge passage 26 and the primary discharge passage 27. The secondary discharge passage 26 and the primary discharge passage 27 are formed at the same position in the circumferential direction of the cylinder and are spaced apart from each other in the direction of the cylinder axis.

The slidable inner-diameter portion 20 of the cylinder body 15 includes a plurality of circumferential seal grooves formed therein, which are spaced apart from each other in the direction of the cylinder axis. Specifically, four circumferential seal grooves, i.e., a circumferential seal groove (circumferential groove) 30, a circumferential seal groove 31, a circumferential seal groove (circumferential groove) 32, and a circumferential seal groove 33 are arranged in this order from the bottom portion 13. Each of the circumferential seal grooves 30 to 33 is formed as a portion recessed outward relative to the radial direction of the cylinder and annularly extending in the circumferential direction of the cylinder.

The circumferential seal groove 30, which is located at a position closest to the bottom portion 13, is formed in the vicinity of the mount opening 24 on a side of the bottom portion 13. A piston seal 35 is fittingly disposed in the circumferential seal groove 30.

An annular open groove 37 is formed in the cylinder body 15 on a side of the open portion 16 relative to the circumferential seal groove 30. The open groove 37 is recessed outwardly from the slidable inner-diameter portion 20 of the cylindrical portion 14 relative to the radial direction of the cylinder so that a communication hole 36 extending from the mount opening 24 on a side of the bottom portion 13 opens into the cylindrical portion 14. The open groove 37 and the communication hole 36 in combination mainly form a secondary supply passage (supply passage) 38, which is capable of allowing communication between the cylinder body 15 and the reservoir 12 and which is always communicated with the reservoir 12.

Figure 2:
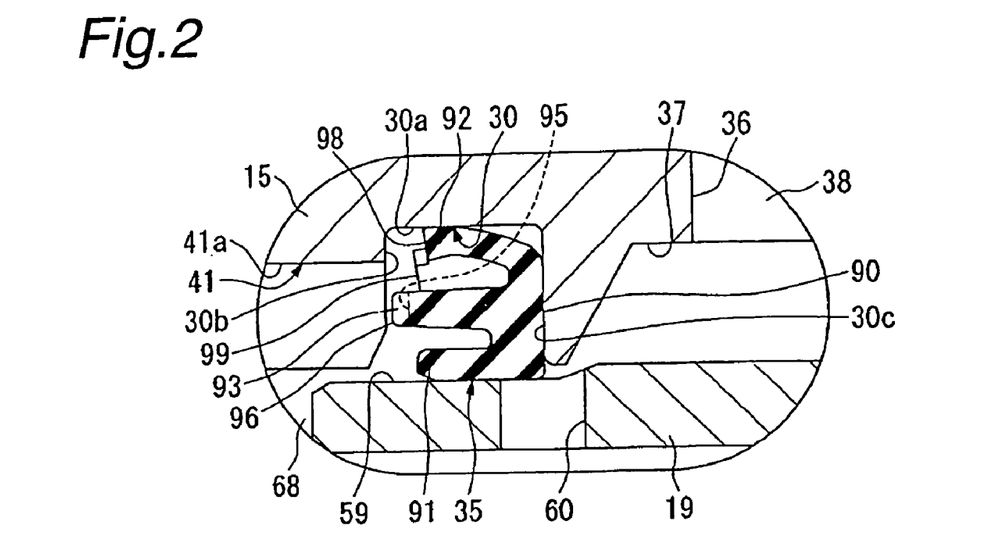
FIG. 2 is an enlarged cross-sectional view of section A, shown in FIG. 1, of the master cylinder according to the embodiment of the present invention.

A communication groove 41 is formed in the slidable inner-diameter portion 20 of the cylinder body 15 on a side of the mount portion 22 relative to the circumferential direction of the cylinder. The communication groove 41 opens into the circumferential seal groove 30 and linearly and slightly extends from the circumferential seal groove 30 toward the bottom portion 13 in the direction of the cylinder axis. Further, the communication groove 41 is formed as a portion recessed outward relative to the radial direction of the cylinder. The communication groove 41 is adapted to allow communication between the circumferential seal groove 30 and the secondary discharge passage 26. The secondary passage 26 is formed in the vicinity of the bottom portion 13 between the bottom portion 13 and the circumferential seal groove 30. As shown in FIG. 2, a bottom surface 41a of the communication groove 41 is formed at a portion inwardly of a bottom surface 30a of the circumferential seal groove 30 relative to the radial direction of the cylinder. The cylinder body 15 has a first hollow portion of an enlarged diameter between the bottom portion 13 and the circumferential seal portion 30. The first hollow portion of an enlarged diameter is coaxial with the slidable inner-diameter portion 20 and has a diameter larger than that of the slidable inner-diameter portion 20. Therefore, a smooth flow of brake fluid between the secondary discharge passage 26 and the circumferential seal groove 30 can be allowed through the first hollow portion of an enlarged diameter. This first hollow portion of an enlarged diameter serves to communicate between the secondary discharge passage 26 and the communication groove 41.

As described above, the circumferential seal groove 31 is formed in the cylinder body 15. The circumferential seal groove 31 is located on a side opposite to the circumferential seal groove 30, that is, on a side of the open portion 16, relative to the open groove 37 in the direction of the cylinder axis. A partition seal 42 is fittingly disposed in the circumferential seal groove 31.

The above-mentioned circumferential seal groove 32 is formed in the cylinder body 15 on a side of the open portion 16 relative to the circumferential seal groove 31 and in the vicinity of the mount opening 25 disposed on a side of the open portion 16. The piston seal 45 is fittingly disposed in the circumferential seal groove 32.

An annular open groove 47 is formed in the cylinder body 15 on a side of the open portion 16 relative to the circumferential seal groove 32. The annular open groove 47 is recessed outwardly from the slidable inner-diameter portion 20 of the cylindrical portion 14 relative to the radial direction of the cylinder so that a communication hole 46 extending from the mount opening 25 on a side of the open portion 16 opens into the cylindrical portion 14. The open groove 47 and the communication hole 46 in combination mainly form a primary supply passage (a supply passage) 48, which is capable of allowing communication between the cylinder body 15 and the reservoir 12 and which is always communicated with the reservoir 12.

Figure 3:
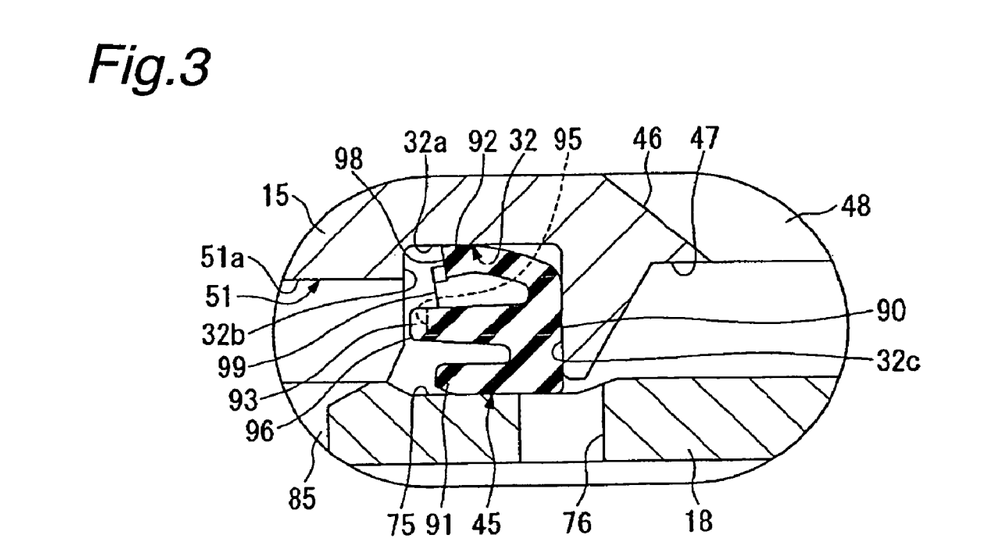
FIG. 3 is an enlarged cross-sectional view of section B, shown in FIG. 1, of the master cylinder according to the embodiment of the present invention.

A communication groove 51 is formed in the slidable inner-diameter portion 20 of the cylinder body 15 on a side of the bottom portion 13 relative to the circumferential seal groove 32 and on a side of the mount portion 22 relative to the circumferential direction of the cylinder. The communication groove 51 opens into the circumferential seal groove 32 and linearly and slightly extends from the circumferential seal groove 32 toward the bottom portion 13 in the direction of the cylinder axis. The communication groove 51 is formed as a portion recessed outward relative to the radial direction of the cylinder. The communication groove 51 is adapted to allow communication between the circumferential seal groove 32 and the primary discharge passage 27. The primary discharge passage 27 is formed in the vicinity of the circumferential seal groove 31. As shown in FIG. 3, a bottom surface 51a of the communication groove 51 is formed at a portion inwardly of a bottom surface 32a of the circumferential seal groove 32 relative to the radial direction of the cylinder. The cylinder body 15 has a second hollow portion of an enlarged diameter between the circumferential seal groove 31 and the circumferential seal groove 32. The second hollow portion of an enlarged diameter is coaxial with the slidable inner-diameter portion 20 and has a diameter larger than that of the slidable inner-diameter portion 20. Therefore, a smooth flow of brake fluid between the primary discharge passage 27 and the circumferential seal groove 32 can be allowed through the second hollow portion of an enlarged diameter. This second hollow portion of an enlarged diameter serves to communicate between the primary discharge passage 27 and the communication groove 51.

As described above, the circumferential seal groove 33 is formed in the cylinder body 15. The circumferential seal groove 33 is located on a side opposite to the circumferential seal groove 32, that is, on a side of the open portion 16, relative to the open groove 47. A partition seal 52 is fittingly disposed in the circumferential seal groove 33.

The secondary piston 19 is fittingly disposed in the cylinder body 15 on a side of the bottom portion 13. The secondary piston 19 has a cylindrical form having one end closed. Specifically, the secondary piston 19 comprises a cylindrical portion 55 and a bottom portion 56 formed on one side of the cylindrical portion 55 in an axial direction of the cylindrical portion 55. The secondary piston 19 is slidably fitted into the slidable inner-diameter portion 20 of the cylinder body 15, with the cylindrical portion 55 being located on a side of the bottom portion 13 of the cylinder body 15. An annular step-like portion 59 is formed in an outer circumferential surface of an end portion of the cylindrical portion 55 on a side opposite to the bottom portion 56. The annular step-like portion 59 has a slightly smaller diameter than the other portion of the cylindrical portion 55. The step-like portion 59 includes a plurality of ports 60 radially formed therein on a side of the bottom portion 56. The ports 60 extend through the annular step-like portion 59 in the radial direction of the cylinder.

A gap adjustment portion 63 is provided between the secondary piston 19 and the bottom portion 13 of the cylinder body 15 so as to determine a gap between the secondary piston 19 and the bottom portion 13 in an initial state in which no input is applied from the brake pedal (not shown in FIG. 1, but located on the right side of FIG. 1). The gap adjustment portion 63 comprises a secondary piston spring 62, a spring retainer 64 which abuts against the bottom portion 13 of the cylinder body 15, a spring retainer 65 which abuts against the bottom portion 56 of the secondary piston 19, and a shaft member 66 having one end and an opposite end. The one end of the shaft member 66 is fixed to the spring retainer 64, while the opposite end of the shaft member 66 is adapted to slide in the spring retainer 65 to support the spring retainer 65. In this way, the shaft member 66 is slidable within a predetermined range to support the spring retainer 65. The secondary piston spring 62 is interposed between the spring retainers 64 and 65.

A secondary pressure chamber (a pressure chamber) 68 for supplying a fluid pressure to the secondary discharge passage 26 is defined by the bottom portion 13 of the cylinder body 15, a portion of the cylindrical portion 14 on a side of the bottom portion 13, and the secondary piston 19. When the secondary piston 19 is positioned such that the ports 60 are open to the open groove 37, the secondary pressure chamber 68 is communicated with the secondary supply passage 38.

On the other hand, an inner circumferential surface of the piston seal 35, which is disposed in the circumferential seal groove 30 of the cylinder body 15 on a side of the bottom portion 13, is adapted to make slidable contact with an outer circumferential surface of the secondary piston 19. Therefore, when the secondary piston 19 moves to a position such that the ports 60 are located on a side of the bottom portion 13 relative to the piston seal 35, the piston seal 35 is capable of sealing a space between the secondary supply passage 38 and the secondary pressure chamber 68. In other words, the piston seal 35 is capable of preventing communication between the secondary pressure chamber 68, and the secondary supply passage 38 and the reservoir 12.

The primary piston 18 is fittingly disposed in the cylinder body 15 on a side of the open portion 16. The primary piston 18 comprises a first cylindrical portion 71, a bottom portion 72 formed on one side of the first cylindrical portion 71 in an axial direction thereof, and a second cylindrical portion 73 formed in the bottom portion 72 on a side opposite to the first cylindrical portion 71. The primary piston 18 is disposed inside the cylinder body 15, with the first cylindrical portion 71 being located on a side of the secondary piston 19 in the cylinder body 15. An output shaft of the brake booster (not shown) is inserted into the second cylindrical portion 73 and is adapted to press the bottom portion 72.

An annular recessed portion 75 is formed in an outer circumferential surface of an end portion of the first cylindrical portion 71 on a side opposite to the bottom portion 72. The recessed portion 75 has a slightly smaller diameter than the other portion of the first cylindrical portion 71. The recessed portion 75 of the first cylindrical portion 71 includes a plurality of ports 76 radially formed therein on a side of the bottom portion 72. The plurality of ports 76 extend through the recessed portion 75.

A gap adjustment portion 79 including a primary piston spring 78 is provided between the secondary piston 19 and the primary piston 18, which determines a gap between the secondary piston 19 and the primary piston 18 in the initial state in which no input is applied from the brake pedal (not shown in FIG. 1 but located on the right side of FIG. 1). The gap adjustment portion 79 comprises a spring retainer 81 which abuts against the bottom portion 56 of the secondary piston 19, a spring retainer 82 which abuts against the bottom portion 72 of the primary piston 18, and a shaft member 83 having one end fixed to the spring retainer 82 and supporting the spring retainer 81 while permitting slidable movement thereof in a predetermined range. The primary piston spring 78 is interposed between the spring retainers 81 and 82.

A space surrounded by the cylindrical portion 14 of the cylinder body 15 on a side of the open portion 16, the primary piston 18 and the secondary piston 19 forms a primary pressure chamber (a pressure chamber) 85 for supplying a fluid pressure to the primary discharge passage 27. When the primary piston 18 is positioned such that the ports 76 are open to the open groove 47, the primary pressure chamber 85 is communicated with the primary supply passage 48. On the other hand, an inner circumferential surface of the piston seal 45, which is disposed in the circumferential seal groove 32 of the cylinder body 15, is adapted to make slidable contact with an outer circumferential surface of the primary piston 18. When the primary piston 18 moves to a position such that the ports 76 are located on a side of the bottom portion 13 relative to the piston seal 45, the piston seal 45 is capable of sealing a space between the primary supply passage 48 and the primary pressure chamber 85. In other words, the piston seal 45 is capable of preventing communication between the primary pressure chamber 85, and the primary supply passage 48 and the reservoir 12.

Figure 4:
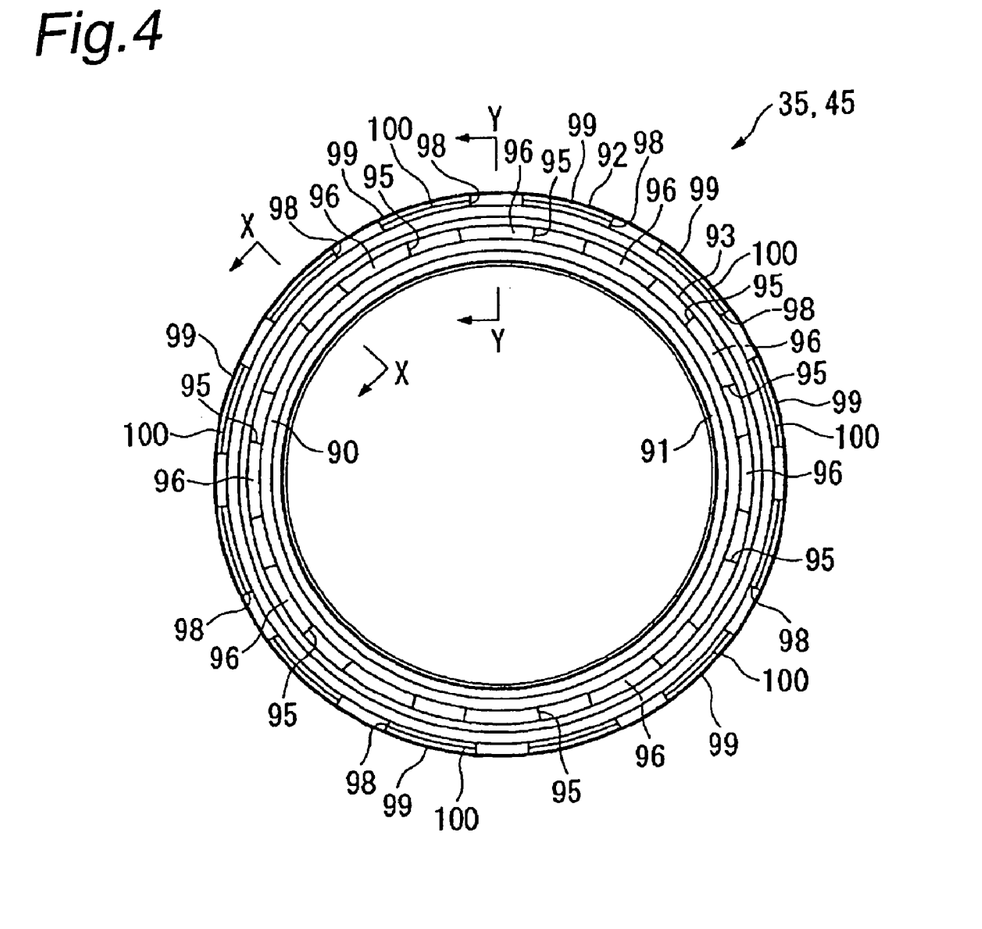
FIG. 4 is a front view of a piston seal of the master cylinder according to the embodiment of the present invention.
Figure 5:
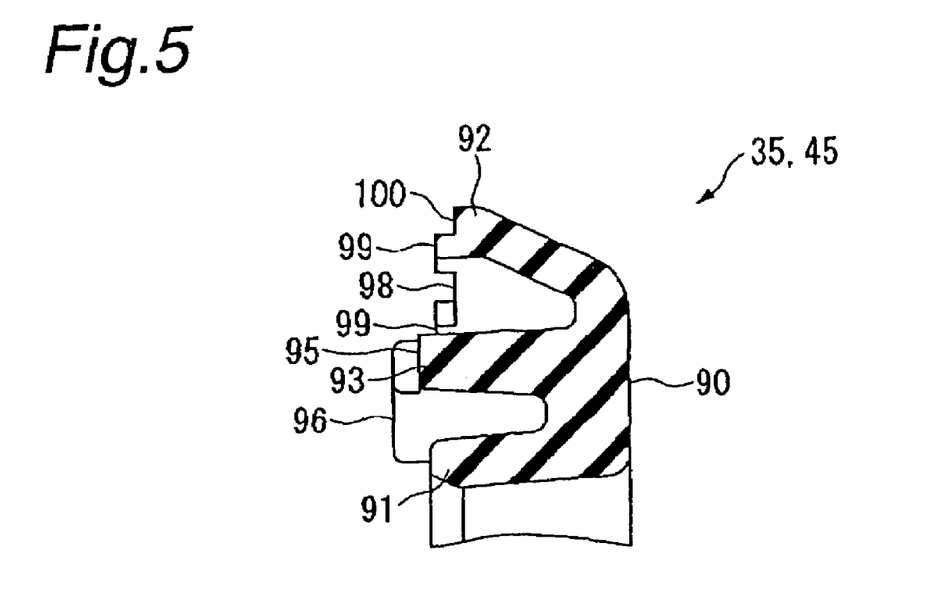
FIG. 5 is an enlarged cross-sectional view of the piston seal of the master cylinder according to the embodiment of the present invention, taken along the line X-X in FIG. 4.
Figure 6:
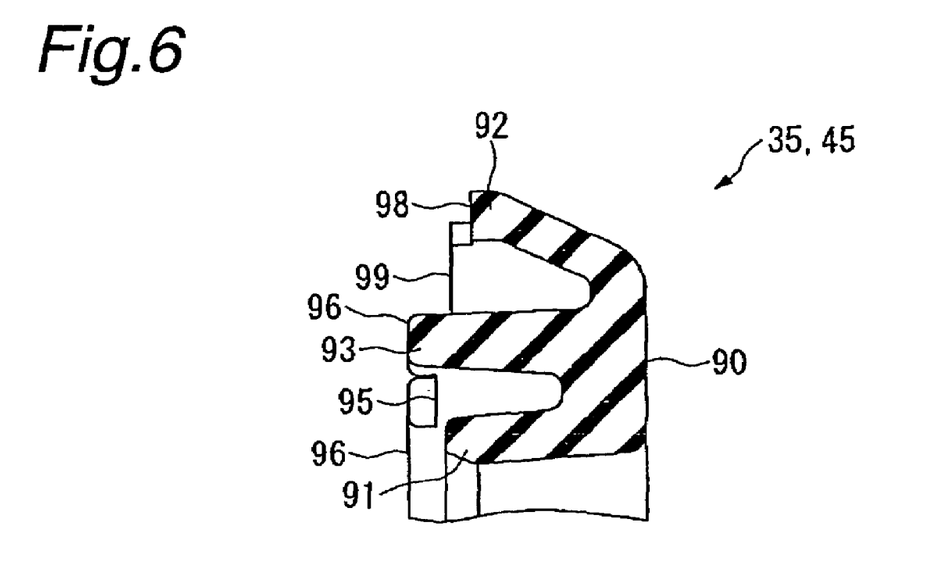
FIG. 6 is an enlarged cross-sectional view of the piston seal of the master cylinder according to the embodiment of the present invention, taken along the line Y-Y in FIG. 4.

In this embodiment, the piston seal 35 on the secondary side and the piston seal 45 on the primary side in use, which are fitted in the circumferential seal groove 30 and in the circumferential seal groove 32, respectively, are of an identical shape. As shown in FIGS. 4 to 6, the piston seals 35 and 45 each have an E-shaped cross section and comprise: an annular base portion 90; an annular inner circumferential lip portion 91 that extends from the inner circumferential side of the base portion 90 to one side substantially in the axial direction of the base portion 90; an annular outer circumferential lip portion 92 that extends from the outer circumferential side of the base portion 90 to the same side to which the inner circumferential lip portion 91 extends; and an annular intermediate projecting portion 93 that is projected between the inner and outer circumferential lip portions 91 and 92 of the base portion 90 to the same side to which these lip portions extend.

The intermediate projecting portion 93 is projected beyond the inner and outer circumferential lip portions 91 and 92. A plurality of cutout grooves 95, which are recessed in the axial direction of the base portion 90, are formed on a projecting tip side of the intermediate projecting portion 93. The plurality of cutout grooves 95 have the same width and are equally spaced in a circumferential direction.

Projecting portions 96 are alternately disposed with the cutout grooves 95, so that the projecting portions 96 appear to be projected in the axial direction. The circumferential width of each of the cutout grooves 95 is smaller than the circumferential width of each of the projection portions 96.

Further, a plurality of cutout grooves 98 are formed on a projecting tip side of the outer circumferential lip portion 92. The plurality of cutout grooves 98 have the same width, are recessed in the axial direction, and are equally spaced in a circumferential direction. Projecting portions 99 are alternately disposed with the cutout grooves 98, so that the projecting portions 99 appear to be projected in the axial direction. The circumferential width of each of the cutout grooves 98 is smaller than that of the projecting portions 99. Further, a cutout portion 100 is formed, over the entire circumferential length of each of the projecting portions 99, on a radially outer side of a tip of the projecting portion 99, so that the projecting portions 99 have a step-like structure. However, this step-like structure is not a requirement.

The number of the cutout grooves 95 of the intermediate projecting portion 93 is equal to that of the cutout grooves 98 of the outer circumferential lip portion 92. Circumferential positions of the cutout grooves 95 of the intermediate projecting portion 93 are adjusted to circumferential positions of the projecting portion 99 of the outer circumferential lip portion 92. A central angle of each of the cutout grooves 95 is smaller than that of each of the projecting portions 99. Further, circumferential positions of the projecting portion 96 of the intermediate projecting portion 93 are adjusted to circumferential positions of the cutout groove 98 of the outer circumferential lip portion 92. The central angle of the cutout grooves 98 is smaller than that of the projecting portions 96.

However, it is to be understood that insomuch as the cutout grooves 95, 98 have the capability of obtaining a flow passage, as described hereinafter, the central angles (the widths) of the cutout grooves 95, 98 may be equal to or larger than those of the projecting portions 99, 96, respectively. Furthermore, the projecting portions 96, 99 may be a plurality of mere bumps that project from the tip of the intermediate projecting portion 93 and the outer circumferential lip portion 92, respectively, thereby forming cutout grooves 95, 98 between the neighboring bumps.

In a state in which no external restriction is imposed, a tip portion of the inner circumferential lip portion 91 is tapered so that the radial width of the tip portion decreases toward a side opposite to the base portion 90, while the radial width of the outer circumferential lip portion 92 gradually increases toward a side opposite to the base portion 90. The intermediate projecting portion 93 extends straight from the base portion 90 in the axial direction of the base portion 90.

As shown in FIG. 2, the inner circumferential lip portion 91 of the piston seal 35 on the secondary side is in sliding contact with an outer circumferential surface of the secondary piston 19. The outer circumferential lip portion 92 abuts against the bottom surface 30a of the circumferential seal groove 30 of the cylinder body 15.

When the secondary piston 19 is fitted into the inner circumferential lip portion 91, the substantially entire axial length of the inner circumferential lip portion 91 is aligned with the axial direction relative to the base portion 90 so that the piston seal 35 fittingly makes slidable contact with the secondary piston 19. In this state, the base portion 90 is moved toward a side of the secondary piston 19. Therefore, a portion of the outer circumferential lip portion 92 closer to the base portion 90 is separated from the bottom surface 30a of the circumferential seal groove 30, while a portion of the outer circumferential lip portion 92 opposite to the base portion 90 gradually spreads out so as to be capable of abutting against the bottom surface 30a. As described above, a length of projection of the outer circumferential lip portion 92 is shorter than that of the intermediate projecting portion 93. Therefore, even in a case such as the piston seal 35 is moved toward the bottom portion 13 so as to be separated from a side surface 30c on the open portion 16 side (on the right side in FIG. 2) of the circumferential seal groove 30, the intermediate projecting portion 93 abuts against a side surface 30b of the circumferential seal groove 30 on the bottom portion 13 side (on the left side in FIG. 2) before the outer circumferential lip portion 92 does. In this way, the projecting tip of the outer circumferential lip portion 92 is kept separate from the side surface 30b of the circumferential seal groove 30.

When a fluid pressure in the secondary pressure chamber 68 becomes larger than that in the secondary supply passage 38 (that is, the atmospheric pressure), the piston seal 35 shuts communication between the secondary pressure chamber 68, and the secondary supply passage 38 and the reservoir 12 (that is, the piston seal 35 seals a space between the secondary pressure chamber 68 and the secondary supply passage 38). On the other hand, when the fluid pressure in the secondary pressure chamber 68 becomes smaller than that in the secondary supply passage 38, the piston seal 35 allows communication between the secondary pressure chamber 68, and the secondary supply passage 38 and the reservoir 12 to thereby supply fluid to the secondary pressure chamber 68.

Similarly, as shown in FIG. 3, when the primary piston 18 is fitted into the inner circumferential lip portion 91, the substantially entire axial length of the inner circumferential lip portion 91 is aligned with the axial direction relative to the base portion 90 so that the piston seal 45 on the primary side fittingly makes slidable contact with the primary piston 18. In this state, the base portion 90 is moved on a side of the primary piston 18. Therefore, a portion of the outer circumferential lip portion 92 closer to the base portion 90 is separated from the bottom surface 32a of the circumferential seal groove 32, while a portion of the outer circumferential lip portion 92 opposite from the base portion 90 gradually spreads out so as to be capable of abutting against the bottom surface 32a. Similar to the piston seal 35, a length of projection of the outer circumferential lip portion 92 of the piston seal 45 is shorter than that of the intermediate projecting portion 93, as described above. Therefore, even in a case such as the piston seal 45 is moved toward the bottom portion 13 (to the left side in FIG. 3) so as to be separated from a side surface 32c of the circumferential seal groove 32 on the open portion 16 side (on the right side in FIG. 3), the intermediate projecting portion 93 abuts against a side surface 32b of the circumferential seal groove 32 on the bottom portion 13 side before the outer circumferential lip portion 92 does. In this way, the projecting tips of the outer circumferential lip portion 92 is kept separate from the side surface 32b of the circumferential seal groove 32.

When a fluid pressure in the primary pressure chamber 85 becomes larger than that in the primary supply passage 48 (that is, the atmospheric pressure), the piston seal 45 shuts communication between the primary pressure chamber 85, and the primary supply passage 48 and the reservoir 12 (that is, the piston seal 45 seals a space between the primary pressure chamber 85 and the primary supply passage 48). On the other hand, when the fluid pressure in the primary pressure chamber 85 becomes smaller than that in the primary supply passage 48, the piston seal 45 allows communication between the primary pressure chamber 85, and the primary supply passage 48 and the reservoir 12 to thereby supply fluid to the primary pressure chamber 85.

As shown in FIG. 1, the partition seal 42 disposed in the circumferential seal groove 31 is a cup seal having a C-shaped cross-section and is fitted in the circumferential seal groove 31, with an opening thereof facing toward the open portion 16. In this way, the partition seal 42 makes slidable contact with the secondary piston 19 to thereby seal a space between the primary pressure chamber 85 and the secondary supply passage 38.

The partition seal 52 disposed in the circumferential seal groove 33 is a cup seal having a C-shaped cross-section and is fitted in the circumferential seal groove 33, with an opening thereof facing toward the bottom portion 13. In this way, the partition seal 52 makes slidable contact with the primary piston 18 to thereby seal the primary supply passage 48 from the outside air.

With the master cylinder 11 described above in this embodiment, as shown in FIG. 2, the piston seal 35 has the intermediate projecting portion 93 which is formed between the inner and outer circumferential lip portions 91 and 92 of the base portion 90 and which is projected beyond the outer circumferential lip portion 92. Therefore, even in a case in which the outer circumferential lip portion 92 of the piston seal 35 is moved toward the side surface 30b of the circumferential seal groove 30, the intermediate projecting portion 93 abuts against the side surface 30b before the outer circumferential lip portion 92 does, thereby preventing contact between the outer circumferential lip portion 92 and the side surface 30b. As a result, a flow passage between the outer circumferential lip portion 92 and the side surface 30b can be securely obtained. Further, cutout grooves 95 are formed on the tip side of the intermediate projecting portion 93 of the piston seal 35; thus, a flow passage can be securely obtained through the cutout grooves 95 even when the intermediate projecting portion 93 abuts against the side surface 30b. Therefore, when the secondary piston 19 is moved back to supply brake fluid to the secondary pressure chamber 68 during a refill of brake fluid or after a normal braking operation, brake fluid is capable of smoothly flowing without obstacle through a gap between the outer circumferential lip portion 92 of the piston seal 35 and the bottom surface 30a of the circumferential seal groove 30 and then into the communication groove 41. Further, a flow passage between the outer circumferential lip portion 92 and its opposing side surface 30b is enlarged by cutout grooves 98 formed on the tip side of the outer circumferential lip portion 92 of the piston seal 35. In case the outer circumferential lip portion 92 of the piston seal 35 abuts against the side surface 30b, the flow passage is securely obtained through the cutout grooves 98, thereby enabling a more smooth flow of brake fluid to the communication groove 41.

Similarly, as shown in FIG. 3, even in a case in which the outer circumferential lip portion 92 of the piston seal 45 is moved toward the side surface 32*b* of the circumferential seal groove 32, the intermediate projecting portion 93 abuts against the side surface 32*b* before the outer circumferential lip portion 92 does, thereby preventing contact between the outer circumferential lip portion 92 and the side surface 30*b*. As a result, a flow passage between the outer circumferential lip portion 92 and the side surface 32*b* can be securely obtained. Further, cutout grooves 95 are formed on the tip side of the intermediate projecting portion 93 of the piston seal 45; thus, a flow passage can be securely obtained through the cutout grooves 95 even when the intermediate projecting portion 93 abuts against the side surface 32*b*. Therefore, when the primary piston 18 is moved back to supply brake fluid to the primary pressure chamber 85 during a refill of brake fluid or after a normal braking operation, brake fluid is capable of smoothly flowing without obstacle through a gap between the outer circumferential lip portion 92 of the piston seal 45 and the bottom surface 32*a* of the circumferential seal groove 32 and then into the communication groove 51. Further, a flow passage between the outer circumferential lip portion 92 and its opposing side surface 32*b* is enlarged by cutout grooves 98 formed on the tip side of the outer circumferential lip portion 92 of the piston seal 45. In case the outer circumferential lip portion 92 of the piston seal 45 abuts against the side surface 32*b*, the flow passage is securely obtained through the cutout grooves 98, thereby enabling a more smooth flow of brake fluid to the communication groove 51.

Therefore, during a refill of brake fluid, brake fluid can be sufficiently supplied from the reservoir 12 through a gap between the piston seal 35 and the bottom surface 30*a* of the circumferential seal groove 30, and the communication groove 41 to the secondary pressure chamber 68 and the secondary discharge passage 26. Further, brake fluid can be sufficiently supplied from the reservoir 12 through a gap between the piston seal 45 and the bottom surface 32*a* of the circumferential seal groove 32, and the communication groove 51 to the primary pressure chamber 85 and the primary discharge passage 27. Therefore, the number of repetitions of a brake-fluid filling operation can be minimized.

When the pistons 18 and 19 move back after a normal braking operation, pressures in the pressure chambers 68 and 85 temporarily become negative. Therefore, it becomes necessary to supply brake fluid through the supply passages 48 and 38. In such a supply of brake fluid, brake fluid smoothly flows into the pressure chambers 68 and 85.

In addition, because the above-described effects can be obtained with the configurations of the piston seals 35 and 45, no particular grooving process or the like is required for the cylinder body 15. As a result, the manufacturing process can be reduced, thereby capable of lowering the manufacturing cost.

Figure 7:
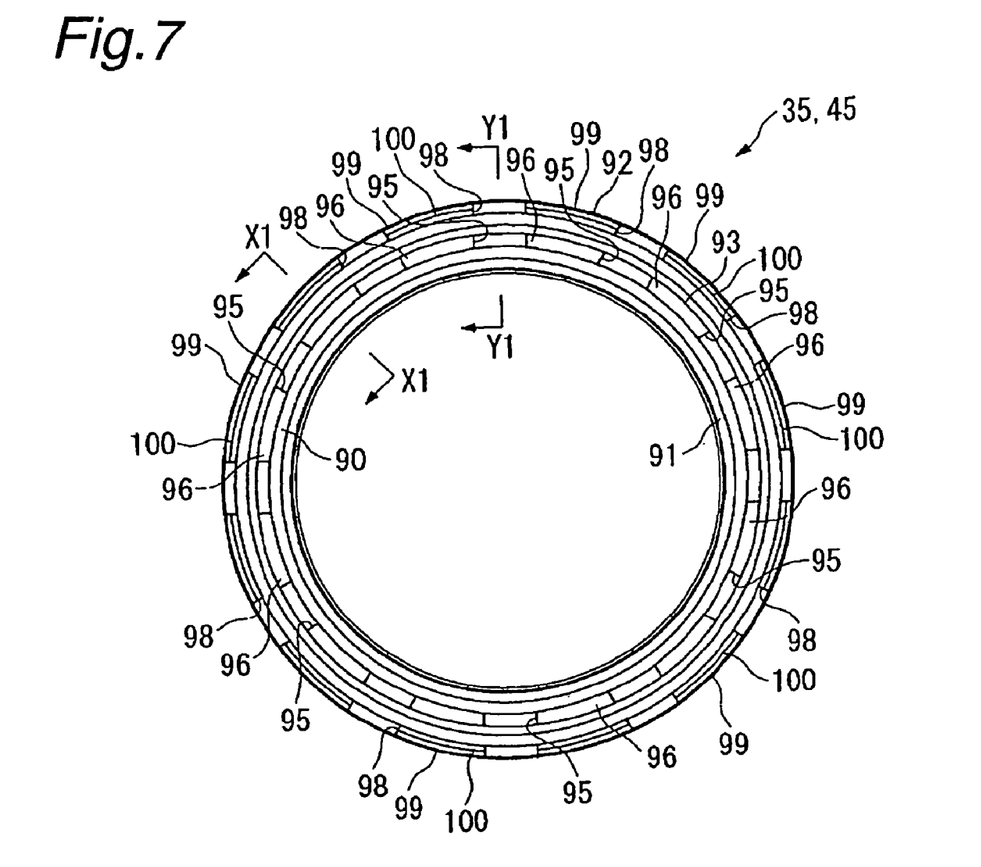
FIG. 7 is a front view of another example of a piston seal of the master cylinder according to an embodiment of the present invention.
Figure 8:
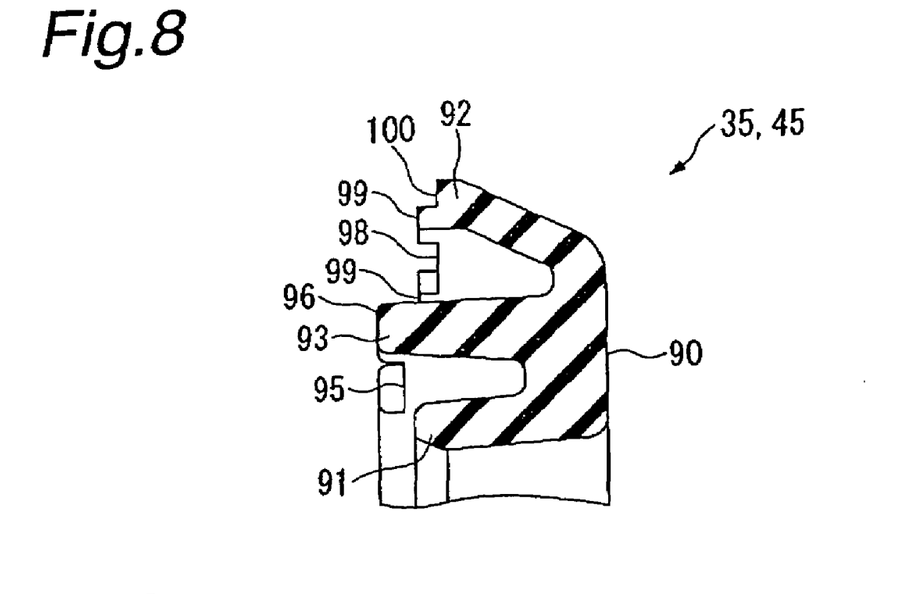
FIG. 8 is an enlarged cross-sectional view of the piston seal of the master cylinder according to the embodiment of the present invention, taken along the line X1-X1 in FIG. 7.
Figure 9:
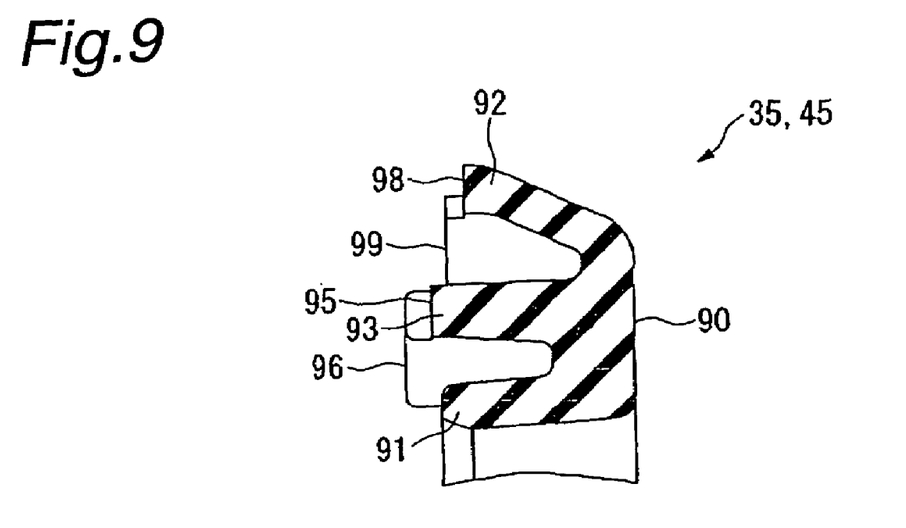
FIG. 9 is an enlarged cross-sectional view of the piston seal of the mater cylinder according to the embodiment of the present invention, taken along the line Y1-Y1 in FIG. 7.

As an example of the piston seals 35 and 45, in the above description, circumferential positions of the cutout grooves 95 of the intermediate projecting portion 93 do not corresponding at all to circumferential positions of the cutout grooves 98 of the outer circumferential lip portion 92. However, the circumferential positions of the cutout grooves 95 of the intermediate projecting portion 93 may correspond at least in part to those of the cutout grooves 98 of the outer circumferential lip portion 92. Further, instead of the partial correspondence in circumferential positions of the cutout grooves, a plurality of the cutout grooves 98 of the outer circumferential lip portion 92 and a plurality of the cutout grooves 95 of the intermediate projecting portion 93 may be formed in equal numbers and correspond with each other in their respective circumferential positions and circumferential widths, as shown in FIGS. 7 to 9.

As described above, circumferential positions of the cutout grooves 95 of the intermediate projecting portions 93 correspond at least in part to those of the cutout grooves 98 of the outer circumferential lip portions 92. Therefore, in case the outer circumferential lip portion 92 of the piston seals 35 or 45 abuts against the side surfaces 30*b* or 32*b*, and the tip portion of the outer circumferential lip portion 92 and the tip portion of the intermediate projecting portion 93 make contact with each other, the cutout grooves 95 of the intermediate projecting portion 93 and the cutout grooves 98 of the outer circumferential lip portion 92 communicate in a radial direction to thereby obtain a flow passage.

According to each of the above embodiments, the piston seal has the intermediate projecting portion formed between the inner circumferential lip portion and the outer circumferential lip portion on the base portion of the piston seal. Further, the intermediate projection portion extends beyond the outer circumferential lip portion. Therefore, even when the outer circumferential lip portion of the piston seal moves toward the side surface of the circumferential groove, the intermediate projecting portion abuts against the side surface before the outer circumferential lip portion does, thereby preventing contact between the outer circumferential lip portion and the side surface. As a result, the flow passage between the outer circumferential lip portion and the side surface can be securely obtained. Further, the cutout grooves are formed on the tip side of the intermediate projecting portion; thus, the flow passage can be securely obtained through the cutout grooves even when the intermediate projecting portion abuts against the side surface. Therefore, when the piston moves back to supply brake fluid to the pressure chamber during a refill of brake fluid or after a normal braking operation, brake fluid is capable of smoothly flowing without obstacle through the gap between the outer circumferential lip portion of the piston seal and the bottom surface of the circumferential groove and then into the pressure chamber.

Further, the cutout grooves are formed on the tip side of the outer circumferential lip portion. Therefore, the flow passage between the outer circumferential lip portion and its opposing side surface is enlarged by the cutout grooves. As a result, in case the outer circumferential lip portion of the piston seal abuts against the side surface, the flow passage is securely obtained through the cutout grooves formed on the tip side of the outer circumferential lip portion, thereby enabling a more smooth flow of brake fluid to the pressure chamber.

Further, with the piston seal in which positions of the cutout grooves of the intermediate projecting portion and positions of the cutout grooves of the outer circumferential lip portion correspond at least in part to each other in a circumferential direction of the piston seal, the cutout grooves of the intermediate projecting portion and the cutout grooves of the outer circumferential lip portion communicate in a radial direction of the piston seal to thereby obtain the flow passage, even in case the outer circumferential lip portion of the piston seal abuts against the side surfaces, and the tip portion of the outer circumferential lip portion and the tip portion of the intermediate projecting portion make contact with each other.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Applications No. 2004-289275 filed on Sep. 30, 2004 and No. 2004-347341 filed on Nov. 30, 2004 each including specification, claims, drawings, and summary is incorporated herein by reference in its entirety.

What is claimed is:

1. A master cylinder comprising:
a cylinder body in a cylindrical form having one end closed and including a discharge passage and a supply passage for a brake fluid, the supply passage being communicated with a reservoir;
a piston slidably disposed in the cylinder body, the piston and the cylinder body defining a pressure chamber therebetween for supplying a fluid pressure to the discharge passage; and
a piston seal provided in a circumferential groove formed in the cylinder body, the piston seal having an inner circumferential surface thereof in slidable contact with the piston and being capable of sealing the pressure chamber from the supply passage;
the piston seal comprising: an annular base portion; an inner circumferential lip portion projecting from an inner circumferential side of the base portion and being in slidable contact with an outer circumferential surface of the piston; an outer circumferential lip portion projecting from an outer circumferential side of the base portion and being in abutment with the circumferential groove of the cylinder body; and an intermediate projecting portion being formed between the inner circumferential lip portion and the outer circumferential lip portion of the base portion and projecting beyond the outer circumferential lip portion, the intermediate projecting portion including a cutout groove formed on a tip side thereof,
wherein, when the piston moves back, brake fluid in the supply passage is supplied to the pressure chamber through a gap between the outer circumferential lip portion of the piston seal and a bottom surface of the circumferential groove, and the cutout groove of the intermediate projecting portion, and
wherein a cutout groove is formed on a tip side of the outer circumferential lip portion.

2. A master cylinder according to claim 1, wherein the intermediate projecting portion is projected beyond the inner circumferential lip portion.

3. A master cylinder according to claim 1, wherein the cutout groove of the intermediate projecting portion includes a plurality of grooves that are formed in the intermediate projecting portion, and the plurality of grooves of the intermediate projecting portion have the same width and are equally spaced in a circumferential direction.

4. A master cylinder according to claim 3, wherein a circumferential width of each of the grooves of the intermediate projecting portion is smaller than a circumferential width of each of projecting portions that are alternately disposed with the grooves.

5. A master cylinder according to claim 1, wherein the cutout groove of the outer circumferential lip portion includes a plurality of grooves that are formed in the outer circumferential lip portion, and the plurality of grooves of the outer circumferential lip portion have the same width and are equally spaced in a circumferential direction.

6. A master cylinder according to claim 5, wherein a circumferential width of each of the grooves of the outer circumferential lip portion is smaller than a circumferential width of each of projecting portions that are alternately disposed with the grooves.

7. A master cylinder according to claim 6, wherein a cutout portion is formed, over the entire circumferential length of each of the projecting portions of the outer circumferential lip portion, on a radially outer side of a tip of the projecting portion, so that the projecting portions have a step-like structure.

8. A master cylinder according to claim 1,
wherein the cutout groove of the intermediate projecting portion includes a plurality of grooves that are formed in the intermediate projecting portion,
the plurality of grooves of the intermediate projecting portion have the same width and are equally spaced in a circumferential direction;
the cutout groove of the outer circumferential lip portion includes a plurality of grooves that are formed in the outer circumferential lip portion,
the plurality of grooves of the outer circumferential lip portion have the same width and are equally spaced in the circumferential direction, and
the number of the grooves of the intermediate projecting portion is equal to the number of the grooves of the outer circumferential lip portion.

9. A master cylinder according to claim 8, wherein circumferential positions of the grooves of the intermediate projecting portion are aligned with circumferential positions of the projecting portions that are alternately disposed with the grooves of the outer circumferential lip portion.

10. A master cylinder according to claim 9, wherein a central angle of each of the grooves of the intermediate projecting portion is smaller than a central angle of each of the projecting portions that are alternately disposed with the grooves of the outer circumferential lip portion.

11. A master cylinder according to claim 8, wherein circumferential positions of the grooves of the outer circumferential lip portion are aligned with circumferential positions of the projecting portions that are alternately disposed with the grooves of the intermediate projecting portion.

12. A master cylinder according to claim 11, wherein a central angle of each of the grooves of the outer circumferential lip portion is smaller than a central angle of each of the projecting portions that are alternately disposed with the grooves of the intermediate projecting portion.

13. A master cylinder according to claim 1, wherein, in a state in which no external restriction is imposed on the piston seal, a tip portion of the inner circumferential lip portion is tapered so that a radial width of the tip portion decreases toward a side opposite to the base portion.

14. A master cylinder according to claim 1, wherein, in a state in which no external restriction is imposed on the piston seal, the radial width of the outer circumferential lip portion gradually increases toward a side opposite to the base portion.

15. A master cylinder according to claim 1, wherein, in a state in which no eternal restriction is imposed on the piston seal, the intermediate projecting portion extends straight from the base portion in an axial direction of the base portion.

16. A master cylinder according to claim 1, wherein a position of the cutout groove of the intermediate projecting portion and a position of the cutout groove of the outer circumferential lip portion are aligned with each other at least in part in a circumferential direction of the piston seal.

17. A master cylinder comprising:
a cylinder body in a cylindrical form having one end closed and including a discharge passage and a supply passage for a brake fluid, the supply passage being communicated with a reservoir;

a piston slidably disposed in the cylinder body, the piston and the cylinder body defining a pressure chamber therebetween for supplying a fluid pressure to the discharge passage; and a piston seal provided in a circumferential groove formed in the cylinder body, the piston seal having an inner circumferential surface thereof in slidable contact with the piston and being capable of sealing the pressure chamber from the supply passage;

the piston seal comprising: an annular base portion; an inner circumferential lip portion projecting from an inner circumferential side of the base portion and being in slidable contact with an outer circumferential surface of the piston; an outer circumferential lip portion projecting from an outer circumferential side of the base portion and being in abutment with the circumferential groove of the cylinder body; and an intermediate projecting portion being formed between the inner circumferential lip portion and the outer circumferential lip portion of the base portion and projecting beyond the outer circumferential lip portion, the intermediate projecting portion including a cutout groove formed on a tip side thereof, wherein, when the piston moves back, brake fluid in the supply passage is supplied to the pressure chamber through a gap between the outer circumferential lip portion of the piston seal and a bottom surface of the circumferential groove, and the cutout groove of the intermediate projecting portion, wherein, in a state in which no external restriction is imposed on the piston seal, the radial width of the outer circumferential lip portion gradually increases toward a side opposite to the base portion.

* * * * *